United States Patent [19]

Hertel et al.

[11] Patent Number: 4,729,700

[45] Date of Patent: Mar. 8, 1988

[54] DRIVE UNIT FOR ROTARY TOOLS

[75] Inventors: Günther Hertel; Karl G. Hertel, both of Nuremberg, Fed. Rep. of Germany

[73] Assignee: Hertel AG Werkzeuge & Hartstoffe, Fürth, Fed. Rep. of Germany

[21] Appl. No.: 837,547

[22] Filed: Mar. 7, 1986

[30] Foreign Application Priority Data

Mar. 8, 1985 [DE] Fed. Rep. of Germany ....... 3508231

[51] Int. Cl.4 .......................... B23C 5/26; B23C 7/00
[52] U.S. Cl. .................................... 409/144; 409/215; 409/233
[58] Field of Search ............... 409/230, 231, 232, 233, 409/234, 144, 215; 279/1 N, 1 Q; 408/139, 140, 239 R, 239 A, 714

[56] References Cited

U.S. PATENT DOCUMENTS 3,633,457  1/1972  Reebe et al. ................ 409/233
3,813,782  6/1974  Nilles et al. ................ 409/233

FOREIGN PATENT DOCUMENTS 181533  10/1983  Japan ..................... 409/231
544519   2/1977  U.S.S.R. ................. 409/215
927416   5/1982  U.S.S.R. ................. 409/230

Primary Examiner—Z. R. Bilinsky
Attorney, Agent, or Firm—Spencer & Frank

[57] ABSTRACT

A drive unit for a rotary tool, which unit includes a housing, a drive shaft mounted in the housing for transferring rotational drive force from a rotary drive to the tool, and a clamping mechanism mounted in the housing for generating a tool clamping movement along the axis of the drive shaft. The drive shaft is a hollow shaft, the clamping mechanism includes a pull rod mounted in the drive shaft and coaxially positioned relative to the drive shaft, the pull rod being mounted to be axially displaceable and fixed against rotation relative to the drive shaft, and the unit further includes a blocking device operative between the drive shaft and the housing for permitting the drive shaft to rotate relative to the housing only when the drive shaft is coupled to the rotary drive.

14 Claims, 2 Drawing Figures

DRIVE UNIT FOR ROTARY TOOLS

BACKGROUND OF THE INVENTION

The present invention relates to a drive unit for rotary tools of the type having a drive shaft and a clamping device, particularly for tool changing systems.

Such drive units are used primarily in automatic processing centers. They are fastened, for example, on a turret head with which a work unit is transferred into its work position and out of this work position into a loading position. With the turret head in the loading position, tools can be exchanged, or replaced.

For releasing and clamping the tools at the loading position, a clamping drive engages the drive unit via a coupling. The same is the case at the work station of the rotary tool with respect to the rotary drive for rotation of the tool.

SUMMARY OF THE INVENTION

It is an object of the present invention to provide a drive unit of the above-mentioned type so that it takes up little room and permits, in a simple manner, the introduction of torque for the clamping drive at the loading position and for the rotary drive at the work position. It is here assumed that in the prior art drive units of the abovementioned type there must always exist an axially acting clamping movement, independently of the structural configuration of the clamping system.

An example for a clamping system driven by axial displacement of a pull rod is referred to in DE-OS [Federal Republic of Germany Laid-open Application] No. 3,309,922. However, the present invention is also suitable for use in clamping systems having different configurations.

The above and other objects are achieved, according to the invention, in a drive unit for a rotary tool, which unit includes: a housing; a drive shaft mounted in the housing for transferring rotational drive force from a rotary drive to the tool; and clamping means mounted in the housing for generating a tool clamping movement along the axis of the drive shaft, by the improvement wherein:

the drive shaft is a hollow shaft;

the clamping means comprise a pull rod mounted in the drive shaft and coaxially positioned relative to the drive shaft, the pull rod being mounted to be axially displaceable and fixed against rotation relative to the drive shaft; and the unit further comprises blocking means operative between the drive shaft and the housing for permitting the drive shaft to rotate relative to the housing only when the drive shaft is coupled to the rotary drive.

The driving force for clamping and the driving force for rotation are introduced separately into the drive unit each in a known manner, at different stations, for example use being made of the force for rotating the turret head carrying the drive unit. However, the forces are always applied at the same location in the drive unit and coaxially therewith.

According to preferred embodiments of the invention, the blocking means comprise a coupling member carried by the drive shaft at the circumference thereof and axially displaceable between a blocking position for preventing the drive shaft from rotating relative to the housing and a release position for permitting such relative rotation, the coupling member being movable into the release position in response to engagement of the drive shaft with the rotary drive. The blocking means further include biassing means urging the coupling member to the blocking position.

This assures that the blocking device disposed between the drive shaft for the transmission of rotary force and the housing is released only in the work position of the drive unit or of the turret head. In all other positions of the turret head, in which the rotary drive for the rotating tool is not coupled in, the blocking device is actively engaged. In particular, this blocking effect occurs automatically whenever the drive unit is in its loading position.

In further accordance with the invention, the drive shaft is arranged to be brought into engagement with the rotary drive by movement of the rotary drive in the direction of movement of the coupling member from the blocking position to the release position. Thus, the coupling movement for the rotary drive is simultaneously the decoupling movement for the coupling member and vice versa.

According to further features of the invention, the clamping means further comprise a mechanism having the general form of a lead screw and threaded nut coupled to the pull rod, and means for applying a rotary force to the mechanism for displacing the pull rod axially relative to the drive shaft.

The means for applying a rotary force comprise a sleeve mounted in the hollow shaft to be axially fixed and rotatable relative to the hollow shaft, and the pull rod displacing mechanism is constituted by mating screw threads on the pull rod and the sleeve. The screw threads are preferably self-locking, or automatic locking. The housing has a front end at which the rotary tool is disposed, the pull rod has a rear end facing away from the first end of the housing, the sleeve projects away from the front end of the housing beyond the rear end of pull rod, the hollow shaft has a rear end which faces away from the front end of the housing, and the means for applying a rotary force further comprise a clamping drive shaft mounted in the hollow shaft and extending between a portion of the sleeve which projects beyond the rear end of the pull rod and the vicinity of the rear end of the hollow shaft, the clamping drive shaft being connected to the sleeve and the end of the clamping drive shaft which is in the vicinity of the rear end of the hollow shaft being couplable to a clamping rotary drive. Further, means for applying a rotary force further comprise pin means extending radially of the axis of rotation of the clamping drive shaft and connecting the clamping drive shaft to the sleeve. This combination of features makes possible a particularly space saving configuration of the clamping drive.

According to a second preferred embodiment of the invention, the clamping means comprise a sleeve which is rotatable about an axis coaxial with the axis of the hollow shaft and means coupled between the sleeve and the pull rod for displacing the pull rod axially in response to rotation of the sleeve, and the drive unit further comprises first and second rotary members mounted to rotate about an axis which is at an angle to the axis of rotation of the drive shaft, the rotary members being arranged to be rotated by rotary drives, first coupling means including bevel gears rotationally coupling the first rotary member to the drive shaft, and second coupling means including bevel gears rotationally coupling the second rotary member to the sleeve.

One of the bevel gears of the second coupling means is mounted for rotation about an axis coaxial with the axis of the hollow shaft, the second coupling means comprise a planetary gear system including a ring gear forming a unit with the one bevel gear, a sun gear forming a unit with the sleeve, and epicyclic planet gears coupling the ring gear to the sun gear, and the hollow shaft is composed of two parts joined together along a radial plane and provided with cooperating recesses in which the planet gears are rotationally mounted. Each planet gear has two stump shafts each mounted in a respective part of the hollow shaft, and the two parts of the hollow shaft are clamped together.

The blocking means are interposed between the housing and the first rotary member. One bevel gear of each coupling means is mounted on the rotary member of the coupling means and the one bevel gear of the first coupling means is spaced radially outwardly from one bevel gear of the second coupling means.

This embodiment of the drive unit has a structural configuration in which the axis of rotation of the rotary tool is disposed at an angle, particularly a right angle, to the axis of rotation of the introduction of the driving torques for the rotary drive and the clamping drive. Here the angular transfer of the clamping force to the pull rod poses considerable construction problems if the structural volume is to be kept as small as possible.

The subject matter of the invention will be described in greater detail below with reference to embodiments that are illustrated in the drawings.

DESCRIPTION OF THE PREFERRED EMBODIMENTS

Figure 1:
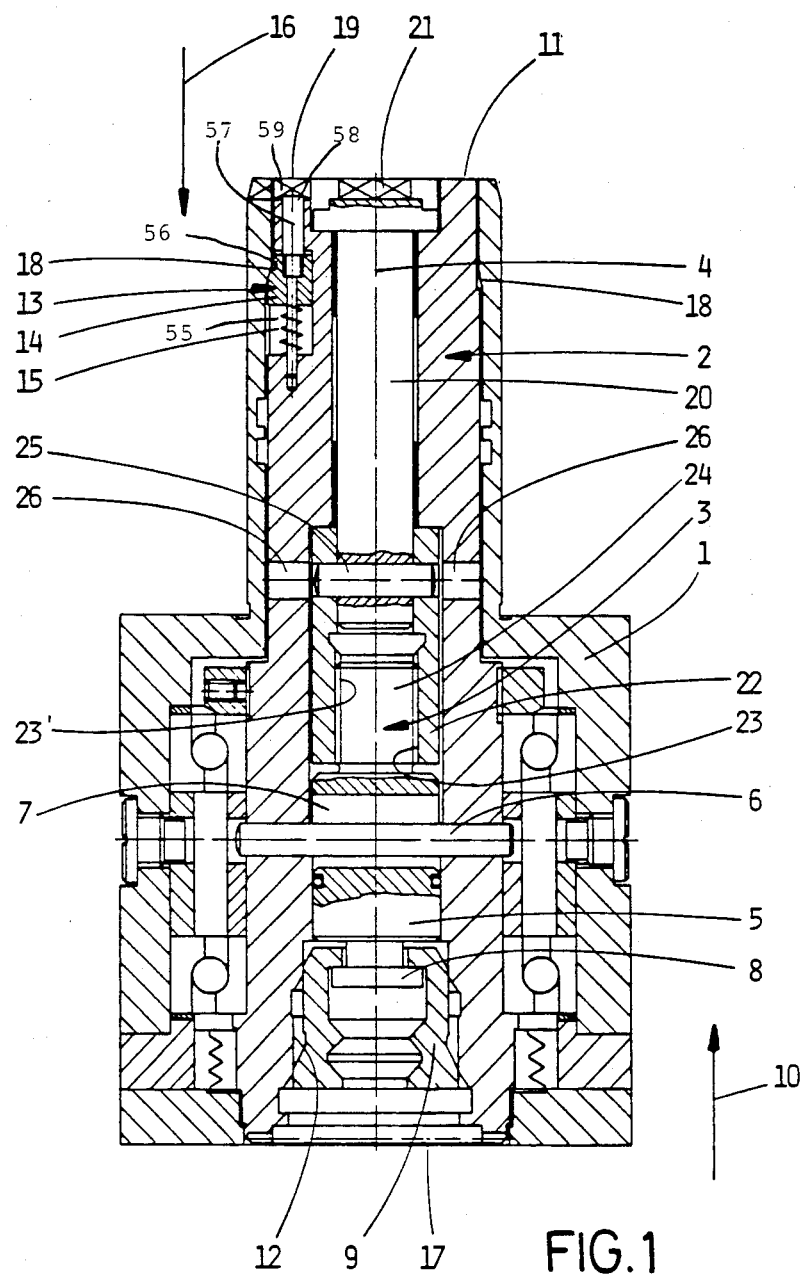
FIG. 1 is a cross-sectional representation of a drive unit according to the invention with linear torque transmission.

The drive unit shown in FIG. 1 essentially includes, in a housing 1, a drive shaft 2 for the transmission of a rotary driving force and a clamping device 3 for generating a clamping movement in the axial direction along the axis of rotation 4, of the rotary drive shaft 2 on the tool (not shown). Drive shaft 2 is a hollow shaft and a coaxial pull rod 5 for a clamping drive is disposed in shaft 2 to be axially displaceable in, and to be secured against rotation relative to, drive shaft 2. To assure nonrotatability between shaft 2 and pull rod 5, the portion of drive shaft 2 which encloses pull rod 5 is traversed in the radial direction by a pin 6 which passes through a longitudinal passage hole 7 in pull rod 5 so as to prevent relative rotation. Hole 7 is elongated in the axial direction to permit a limited relative axial movement between shaft 2 and rod 5.

Pull rod 5 has a head 8 which engages in a collet 9 which, in order to radially clamp a tool bit (not shown), is pulled in the axial direction 10 toward the rear end 11 of the drive unit. Collet 9 is a segmented device, the segments of which are radially expandible to permit insertion and removal of a shank of a tool or tool holder. The structure and operation of such a collet 9, in conjunction with the partially conical configuration of the inner wall 12 of the region of hollow drive shaft 2 surrounding collet 9 is disclosed in principle in DE-OS No. 3,309,922 and therefore will not be discussed in detail here.

In the region of rear end 11, rotary drive shaft 2 is provided with an axial recess 55 in which is disposed a blocking device 13 which permits relative movement between rotary drive shaft 2 and housing 1 only if the rotary drive is in its engaged position (not shown). Blocking device 13 is shown in FIG. 1 in its blocking position and includes a coupling member 14 which is displaceable only axially, relative to shaft 2, along recess 55, and is urged by a compression spring 15 into engagement with housing 1. Coupling member 14 is provided, at its end facing rear end 11, with a sloping face 56 which forms a segment of a conical surface coaxial with axis 4. When blocking device 13 is in its blocking position, sloping face 56 of coupling member 14 is pressed against an inwardly facing annular conical surface portion 18 of housing 1, which surface portion is formed to match sloping face 56 so that when surface sloping face 56 is pressed against surface portion 18, rotation between shaft 2 and housing 1 is prevented. In the blocking position of device 13, coupling member 14 is, in effect, wedged between surface portion 18 and the base of recess 55 so that a sufficiently forceful friction contact is generated between sloping face 56 and surface portion 18 to reliably prevent rotation of shaft 2 relative to housing 1.

Blocking device 13 further includes a pressure pin 57 which is mounted in shaft 2 for axial movement relative thereto and which engages coupling member 14 so that when coupling member 14 is in its blocking position, pin 57 is pushed upwardly by the action of spring 15 and the rear end 58 of pin 57 projects into a groove 59 provided at the rear face 19 of hollow shaft 2.

The rotary drive for shaft 2 may include a dog or claw coupling having a component which, when the rotary drive is moved in the direction of arrow 16 to engage shaft 2, engages in groove 59 to press pressure pin 57 downwardly, in the direction of arrow 16. Pressure pin 57 then presses coupling member 14 downwardly, in opposition to the force of spring 15, so that sloping face 56 moves out of contact with surface portion 18. Then shaft 2 is free to rotate relative to housing 1.

When a rotary drive engages shaft 2, no external driving force is being applied to clamping drive shaft 20.

Upon disengagement of the rotary drive from shaft 2, spring 15 automaticaly returns coupling member 14 to its blocking position and pin 57 to the position in which its rear end 58 projects into groove 59.

The decoupling movement of coupling member 14 and the coupling movement of the rotary drive to couple it with rotary drive shaft 2 thus occur in the same direction.

The axial clamping and releasing movement of clamping device 3 and pull rod 5, respectively, occurs by the action of a rotary drive for the clamping drive shaft 20.

When clamping shaft 20 is engaged by an associated rotary drive, the drive unit is in a position different than that at which hollow shaft 2 can be engaged by a rotary drive. Therefore, whenever clamping drive shaft 20 is in position to be engaged by its associated rotary drive, no rotary drive can be connected to hollow shaft 2. Therefore, in this situation, blocking device 13 is in its blocking position so that hollow shaft 2 cannot rotate relative to housing 1.

Clamping drive shaft 20 is mounted in the rearward region of the drive unit, so as to be rotatable about axis 4. The introduction of the rotary driving force for shaft 20 likewise takes place from the rear end 11 of the drive unit by coupling a rotary drive (not shown) to the front end 21 of clamping drive shaft 20. This coupling can be effected in any conventional manner.

Clamping drive shaft 20 is fixed to a threaded sleeve 22 which is likewise arranged coaxially with respect to clamping drive shaft 20 within rotary drive shaft 2. Threaded sleeve 22 has an internal thread 23 which is screwed onto an external thread 23' formed at the rear end 24 of pull rod 5 and together with external thread 23 forms a type of lead screw and nut mechanism. However, in this mechanism, sleeve 22, which is analogous to a nut, rotates, and pull rod 5, which is analogous to a lead screw, is moved axially without rotating. The screw threads 23 and 23' are self-locking.

At its end which faces away from frontal face 17 or the tool, respectively, and which is not provided with an internal thread, threaded sleeve 22 projects beyond the rear end 24 of pull rod 5 in the direction toward rear end 11 and this end of sleeve 22 is firmly seated on, and radially pinned by a pin 25 to the clamping drive shaft 20. To permit insertion of pin 25, a radial through bore 26 is provided in hollow shaft 2. Pin 25 prevents relative rotation between sleeve 22 and shaft 20.

The operation of the drive unit will now be described. At a clamping or loading station, rotary drive shaft 2 is out of contact with a rotary drive. Consequently, blocking device 13 blocks and prevents any relative movement between rotary drive shaft 2 and housing 1. In this position, a rotary drive engages the frontal end 21 of clamping drive shaft 20 so that threaded sleeve 22 is displaced, depending on the direction of rotation, so as to open or close collet 9 in the direction toward frontal face 17 or the rear end 11, respectively, of the drive unit. Pull rod 5 is permanently prevented by pin 6, which is fixed in rotary drive shaft 2, from performing a relative roational movement with respect to rotary drive shaft 2.

Figure 2:
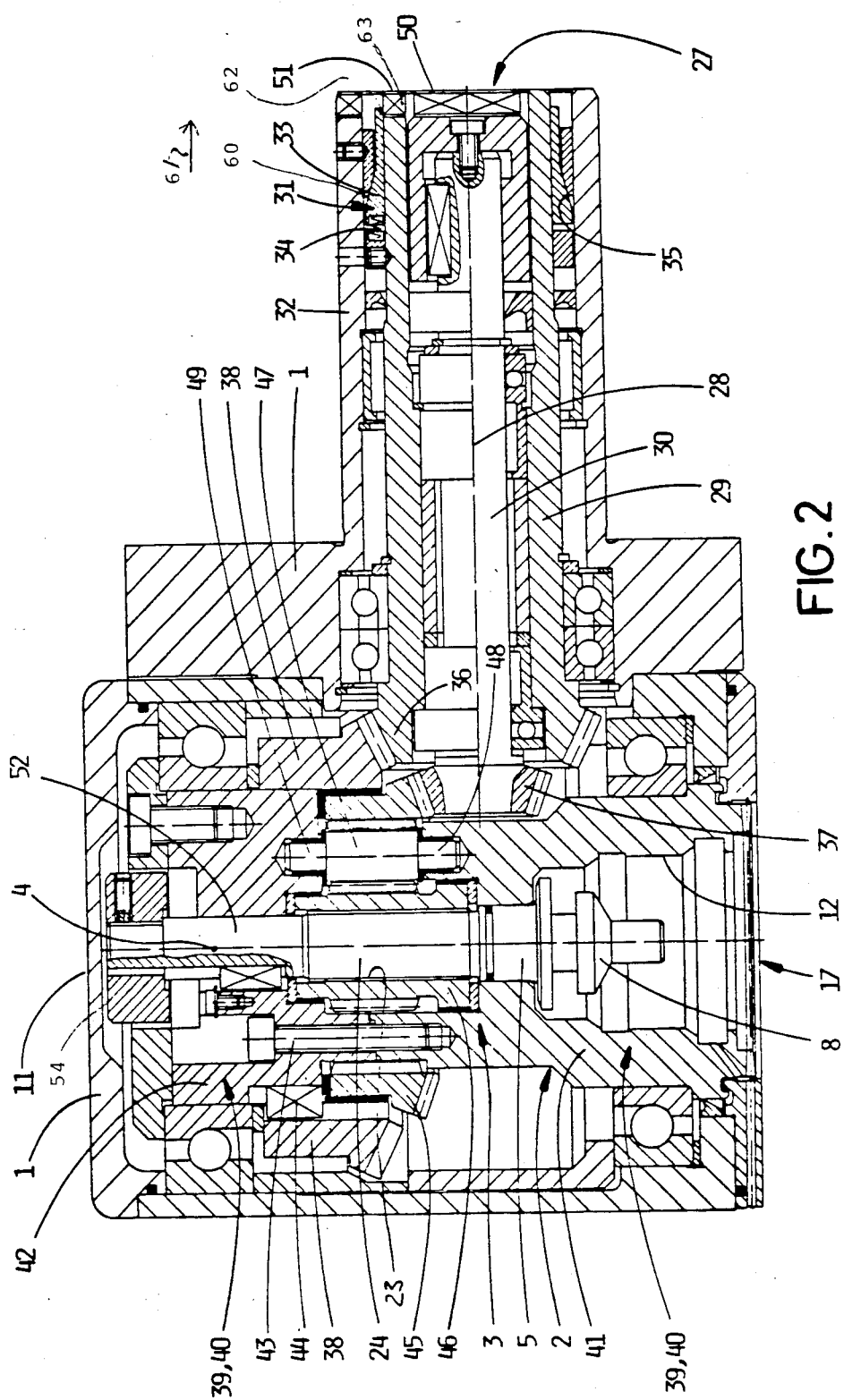
FIG. 2 is a cross-sectional view analogous to FIG. 1 of a modified embodiment of a drive unit according to the invention in which the torque is transferred in the manner of an angular gear.

In the embodiment shown in FIG. 2 functionally identical parts have the same reference numerals as in FIG. 1 and collet 9 is not shown. The rotary drive and the clamping drive are likewise rotational drives but are introduced not from the rear end 11 of the drive unit but via a lateral side 27. The axis of rotation 28 of the side from which the driving force is introduced is at a right angle to the axis of rotation 4 of the tool. The rotary and clamping forces are transmitted, via a bevel gear, from the side at which the driving force is introduced to the rotary drive discharge side. To introduce the rotary drive at side 27, there is provided a hollow introduction shaft 29 which is rotatably mounted within housing 1 and the force for the clamping drive is introduced by means of clamping drive introduction shaft 30 which is mounted within hollow introduction shaft 29 so that shaft 30 is rotatable relative to hollow shaft 29.

A blocking device 31 which corresponds in function to blocking device 13 is effective between hollow introduction shaft 29 and housing 1, or a housing tube 32 which forms part of housing 1 and which projects in the direction toward side 27. Corresponding to blocking device 13, blocking device 31 includes a coupling member 33 which is mounted on the outer circumference of hollow introduction shaft 29 in a manner secure against rotation relative to shaft 29 but axially displaceable relative to shaft 29 against the pressure of a spring 34. Coupling member 33 is in the form of an annular sleeve surrounding shaft 29.

The outer surface of coupling member 33 has a conical portion 60 which cooperates with an inwardly facing conical surface of a ring 35 which is fixed to the inner wall of housing tube 32. A spring 34, analogous to spring 15 of FIG. 1, presses coupling member 33 in the direction of arrow 61 into its blocking position where coupling member 33 presses against ring 35. In this position, shaft 29 is fixed against rotation in housing tube 32.

Hollow shaft 29 is provided, at its front end 51, with a groove 63 for receiving a component of a dog or claw coupling of a rotary drive for shaft 29. When blocking device 31 is in its blocking position, the frontal face 62 of coupling member 32 projects into groove 63. Therefore, when the coupling of a rotary drive engages the front end 51 of shaft 29, so that the coupling component of the rotary drive engages groove 63, that coupling component will engage frontal face 62 and thus press coupling member 32 away from its blocking position, in opposition to the force of spring 34. Then, shaft 29 is free to rotate relative to housing tube 32.

At their ends facing away from side 27, hollow introduction shaft 29 and clamping drive introduction shaft 30 are each provided with a bevel gear 36 and 37, respectively. Bevel gear 36 of hollow introduction shaft 29 meshes with a bevel gear 38 which rotates about axis of rotation 4 and forms a unit with rotary drive shaft 39, which itself has the configuration of a hollow shaft 40. Bevel gears 36 and 38 together form a bevel gear mechanism. Hollow shaft 40 is composed of a hollow shaft frontal portion 41 and a hollow shaft rear portion 42 which are both permanently clamped together in the direction of axis of rotation 4 by means of connecting screws 43 to form a single unit. The permanent connection between bevel gear 38 and hollow shaft rear portion 42 is effected by means of a spline connection 44.

Within bevel gear 38 for the transmission of the rotary driving force, bevel gear 45 is mounted coaxially with axis of rotation 4 so as to transmit the clamping force. Bevel gear 45 meshes with bevel gear 37 of hollow introduction shaft 29, so that bevel gears 37 and 45 form a bevel gear mechanism.

Bevel gear 45 is also the internally toothed ring gear of an epicyclic gear mechanism. Threaded sleeve 46 which is screwed onto the rear end 24 of pull rod 5 is the sun gear of this gear mechanism whose ring gear is formed by bevel gear 45. Planet gears 47 are distributed uniformly around threaded sleeve 46 and each gear 47 has two stump support shafts 48 and 49 at opposite ends of the gear. Shaft 48 is mounted in hollow shaft front portion 41 and shaft 49 is mounted in hollow shaft rear portions 42.

In the embodiment according to FIG. 2, the rear end 24 of pull rod 5 is extended by an extension 52, in the direction toward rear end 11. In the region of extension 52, pull rod 5 is associated with a spline connection 54 which prevents relative rotation between rod 5 and shaft 40 but which permits a certain axial movement of rod 5 relative to shaft 40. Threaded sleeve 46 is mounted between hollow shaft front portion 41 and hollow shaft rear portion 42 so as to be nondisplaceable in the axial direction relative to drive shaft 2.

A rotary drive for clamping drive shaft 30 can be coupled to that shaft, at front end 50, in any conventional manner.

The drive unit according to FIG. 2 operates as follows: if a tool is to be exchanged, hollow introduction shaft 29 is blocked with respect to housing 1 by blocking device 31. The clamping drive engages at the front end 50 of clamping drive introduction shaft 30. Its rotational movement is transferred by means of bevel gear mechanism 37, 45 to threaded sleeve 46. Threaded sleeve 46 is here screwed onto the rear end 24 of pull rod 5 in the same manner as in the embodiment of FIG. 1. However, threaded sleeve 46 here forms the sun gear and bevel gear 45 the ring gear of an epicyclic gear mechanism whose planet, or epicyclic, gears 47 are rotationally mounted in hollow rotary drive shaft 40. When the clamping force is transmitted via bevel gear mechanism 37, 45, hollow rotary drive shaft 40 is blocked with respect to housing 1 by way of blocking device 31 and the bevel gear mechanism 36, 38 that is effective between blocking device 31 and hollow rotary drive shaft 40.

In the work station of the drive unit, clamping force introduction shaft 30 has no connection with a torque drive. The rotary driving force is introduced via a coupling claw disposed at the front end 51 of hollow introduction shaft 29. The latching movement of the claw coupling disposed there, for example, releases the blocking device 31 in that coupling member 33 goes out of engagement with housing tube 32, against the pressure of spring 34. Via hollow introduction shaft 29, bevel gears 36 and 38 and spline connection 44, the driving torque is transferred to hollow drive shaft 40, which is in a rotationally secured connection via collet 9 (not shown, but acting analogously to FIG. 1) with the tool head or the rotating tool (not shown), respectively. Similarly to the embodiment of FIG. 1, all components of the clamping device thus run in synchronism with rotation of the tool rotary drive during the rotational operation of the tool.

The drive unit according to the invention can support any suitable tool, such as a drill bit, a cutter or a spindle equipped with a lathe tool.

It will be understood that the above description of the present invention is susceptible to various modifications, changes and adaptations, and the same are intended to be comprehended within the meaning and range of equivalents of the appended claims.

What is claimed is:

1. In a drive unit for a rotary tool, which unit includes: a housing having a tool receiving side and a drive power input side; a hollow drive shaft mounted in the housing for transferring rotational drive force from a first drive motor to the tool; and clamping means disposed within the drive shaft for generating a tool clamping movement along the axis of the drive shaft, the improvement wherein:

said clamping means comprise: a pull rod having screw threads and mounted in said hollow drive shaft and coaxially positioned relative to said hollow drive shaft, said pull rod being mounted to be axially displaceable, and fixed against rotation, relative to said hollow drive shaft; a sleeve mounted in said hollow drive shaft to be axially fixed, and rotatable, relative to said hollow drive shaft, said sleeve being threaded to mate with the threads on said pull rod so that said sleeve and said pull rod form a screw and nut mechanism, with said pull rod being disposed between said sleeve and said tool receiving side of said housing; and a clamping drive shaft couplable to a clamping rotary drive and operatively associated with said sleeve for rotating said sleeve when said clamping drive shaft is rotated by the clamping rotary drive; and said unit further comprises blocking means operative between said hollow drive shaft and said housing to be automatically activated by connection of the first drive motor to said hollow drive shaft for permitting said hollow drive shaft to rotate relative to said housing only when said hollow drive shaft is coupled to the first drive motor, and to block rotation of said hollow drive shaft relative to said housing when said clamping drive shaft is coupled to the clamping rotary drive.

2. A drive unit as defined in claim 1 wherein said blocking means comprise: a coupling member carried by said hollow drive shaft at the circumference thereof and axially displaceable between a blocking position for preventing said drive shaft from rotating relative to said housing and a release position for permitting such relative rotation, said coupling member being movable into said release position in response to engagement of said hollow drive shaft with the first drive motor; and biasing means urging said coupling member to said blocking position.

3. A drive unit as defined in claim 2 wherein said hollow drive shaft is arranged to be brought into engagement with the first drive motor by movement of the first drive motor in the direction of movement of said coupling member from said blocking position to said release position.

4. A drive unit as defined in claim 1 wherein said screw threads are self-locking.

5. A drive unit as defined in claim 1 wherein the rotary tool is disposed at the tool receiving side of said housing, said pull rod has a rear end facing away from said tool receiving side of said housing, said sleeve projects away from said tool receiving side of said housing beyond said rear end of said pull rod, said hollow drive shaft has a rear end which faces away from said tool receiving side of said housing, and said clamping drive shaft extends between a portion of said sleeve which projects beyond said rear end of said pull rod and the vicinity of said rear end of said hollow drive shaft, said clamping drive shaft being connected to said sleeve and the end of said clamping drive shaft which is in the vicinity of said rear end of said hollow being conplable to the clamping rotary device.

6. A drive unit as defined in claim 5 wherein said clamping means further comprise pin means extending radially of the axis of rotation of said clamping drive shaft and connecting said clamping drive shaft to said sleeve.

7. A drive unit as defined in claim 6 wherein said hollow drive shaft is provided with a radial bore for introduction of said pin means.

8. A drive unit as defined in claim 1 wherein said drive unit further comprises first and second rotary members mounted to rotate about an axis which is at an angle to the axis of rotation of said hollow drive shaft, said rotary members being arranged to be rotated by the drive motor and claimping rotary drive, respectively, first coupling means including bevel gears rotationally coupling said first rotary member to said hollow drive shaft, and second coupling means including bevel gears rotationally coupling said second rotary member to said sleeve.

9. A drive unit as defined in claim 8 wherein: one of said bevel gears of said second coupling means is mounted for rotation about an axis coaxial with the axis of said hollow drive shaft; said second coupling means comprise a planetary gear system including a ring gear forming a unit with said one bevel gear, a sun gear forming a unit with said sleeve, and epicyclic planet gears coupling said ring gear to said sun gear; and said hollow shaft is composed of two parts joined together along a radial plane and provided with cooperating recesses in which said planet gears are rotationally mounted.

10. A drive unit as defined in claim 9 wherein each said planet gear has two stump shafts each mounted in a respective part of said hollow shaft, and further comprising means clamping said two parts of said hollow shaft together.

11. A drive unit as defined in claim 8 wherein said blocking means are interposed between said housing and said first rotary member.

12. A drive unit as defined in claim 8 wherein one said bevel gear of each of said coupling means is mounted on said rotary member of said coupling means and said one bevel gear of said first coupling means is spaced radially outwardly from said one bevel gear of said second coupling means.

13. A drive unit as defined in claim 8 wherein the axis of rotation of said first and second rotary members is at right angles to the axis of rotation of said hollow shaft and said sleeve.

14. A drive unit as defined in claim 1 wherein said clamping drive shaft is disposed in said hollow drive shaft so as to be axially fixed relative to said hollow drive shaft, and said clamping drive shaft is fixed to said sleeve.

* * * * *